United States Patent [19]

Rowlands

[11] Patent Number: 5,626,439
[45] Date of Patent: May 6, 1997

[54] DIVER'S VEST HAVING COMPRESSED AIR TIGHTENING DEVICE

[76] Inventor: Albert J. Rowlands, Rte. 6, Box 360, Charleston, W. Va. 25311

[21] Appl. No.: 568,842

[22] Filed: Dec. 7, 1995

[51] Int. Cl.⁶ ..................................................... B63C 11/02
[52] U.S. Cl. .......................... 405/186; 24/68 R; 114/315; 405/185
[58] Field of Search .................................. 405/186, 185; 24/68 R, 68 CD; 254/93 A, 93 H, 228

[56] References Cited

U.S. PATENT DOCUMENTS

| | | | |
|---|---|---|---|
| 2,383,061 | 8/1945 | Johnson | 254/228 |
| 2,609,953 | 9/1952 | Schramm | 254/93 R X |
| 4,004,777 | 1/1977 | Despas | 254/93 A |
| 4,706,343 | 11/1987 | Neidigk | 24/68 R |
| 4,779,554 | 10/1988 | Courtney | 405/186 X |
| 5,218,745 | 6/1993 | Hollis et al. | 24/68 R X |

*Primary Examiner*—Dennis L. Taylor

[57] ABSTRACT

A diving outfit, vest and tightening device is provided for securing an air tank to a vest element. The device operates by air pressure supplied from the diver's air tank, and tightening of the belt is achieved by pressurized extension of a piston within a cylinder. The device is useful for securing air tanks to diving vests, and the outfit, vest and device are useful for allowing divers to secure the air tank with a minimal of manual force.

5 Claims, 8 Drawing Sheets

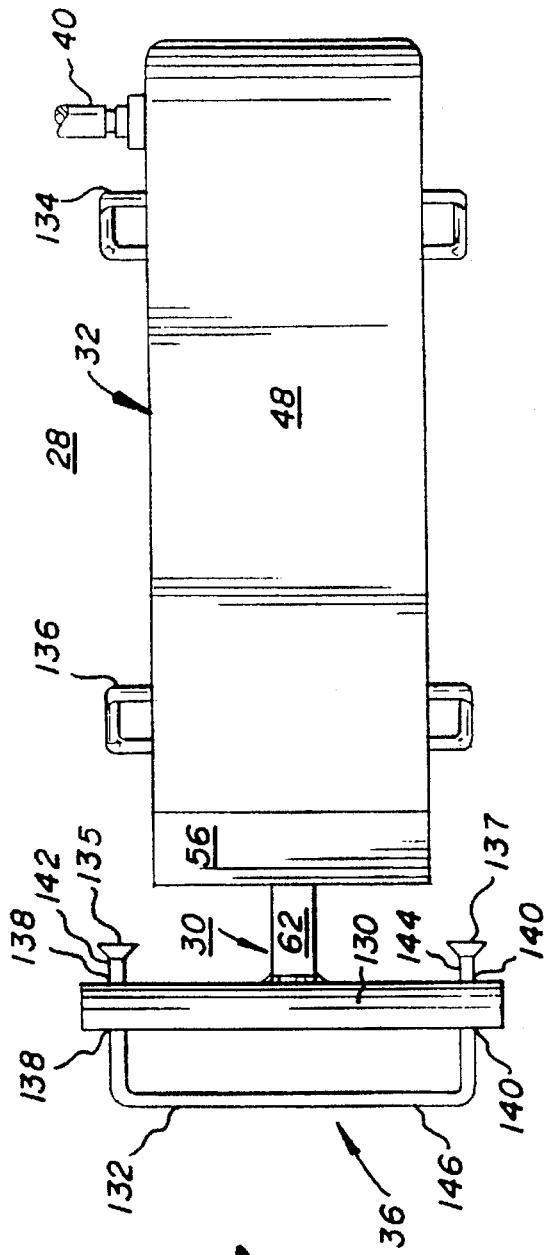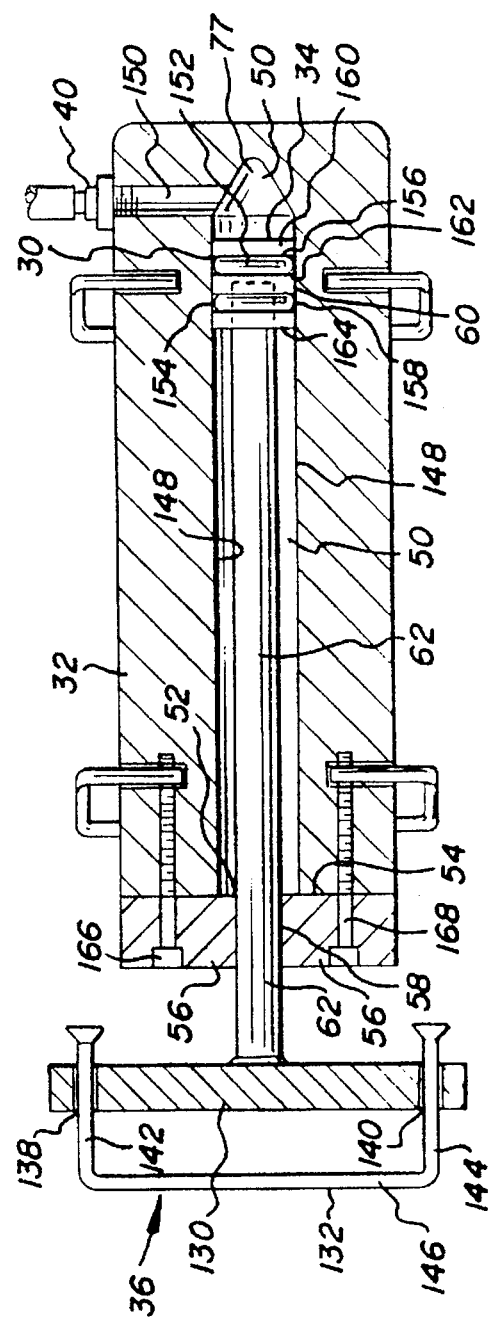

FIG. 9
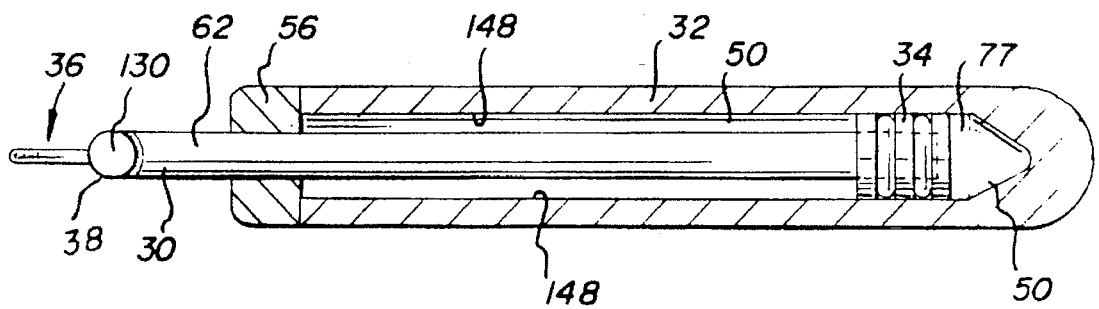
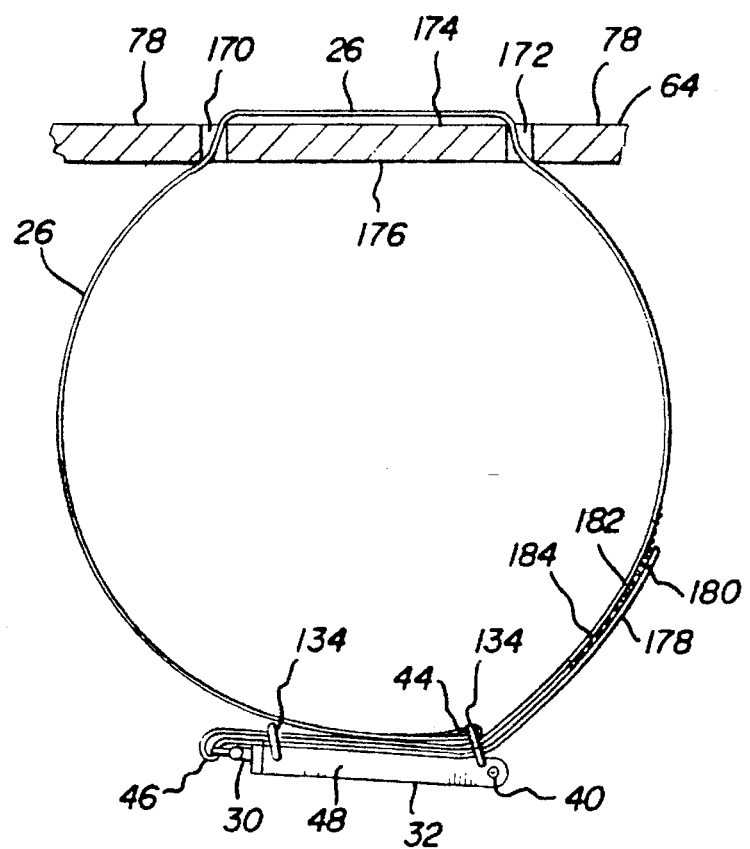
FIG. 10

DIVER'S VEST HAVING COMPRESSED AIR TIGHTENING DEVICE

BACKGROUND OF THE INVENTION

1. Field of the Invention

The present invention relates to scuba diving vests and equipment, and more particularly relates to scuba diving vests and equipment having a pressurized air tank.

2. Description of the Related Art

Conventional scuba diving equipment involves a vest having a compressed air tank releasably attached thereto. Typically the air tank is attached to the vest by means of a belt and buckle wherein the buckle is snapped in place by manual force sufficient to overcome the torque created by the buckle pulling against the belt, see for example, Faulconer, U.S. Pat. No. 4,778,307, issued Oct. 18, 1988, which is incorporated herein by reference and Matsuoka, U.S. Pat. No. 5,363,790, issued Nov. 15, 1994, which is also incorporated herein by reference. Such high torque buckles can be difficult to close for individuals of reduced strength such as children and others, and as such, obtaining the desired degree of tightness on the belt to sufficiently retain the air tank can be difficult to achieve for such individuals.

Consequently, there is a need for a system for tightening the belt on air tanks of diving vests which will be easier for the wearer.

BRIEF DESCRIPTION OF THE DRAWINGS

FIG. 7 is a side elevational view of a tightening device according to the present invention;

FIG. 8 is a cut away vertical cross-sectional side elevational view of the tightening device of FIG. 7 showing the piston within a cavity;

FIG. 9 is a cross-sectional view of the tightening device according to FIG. 7 showing the piston within the cavity;

FIG. 10 is a cut away top elevational view of the vest showing the tightening device and the belt according to the present invention;

SUMMARY OF THE INVENTION

The present invention involves a diving vest having a belt for securing a compressed air tank to the vest and means for tightening the belt by compressed air pressure. A corresponding method is also provided for securing an air tank to a vest. The belt tightening means involves a piston and cylinder and a coupler for coupling with an air hose in communication with the air tank. In operation, the cylinder is affixed at one end to the belt, the piston is affixed to another portion of the belt, and air is fed from the air tank through a hose through a coupler into the cylinder to force the piston to extend thereby tightening the belt.

DETAILED DESCRIPTION OF THE INVENTION

Figure 1:
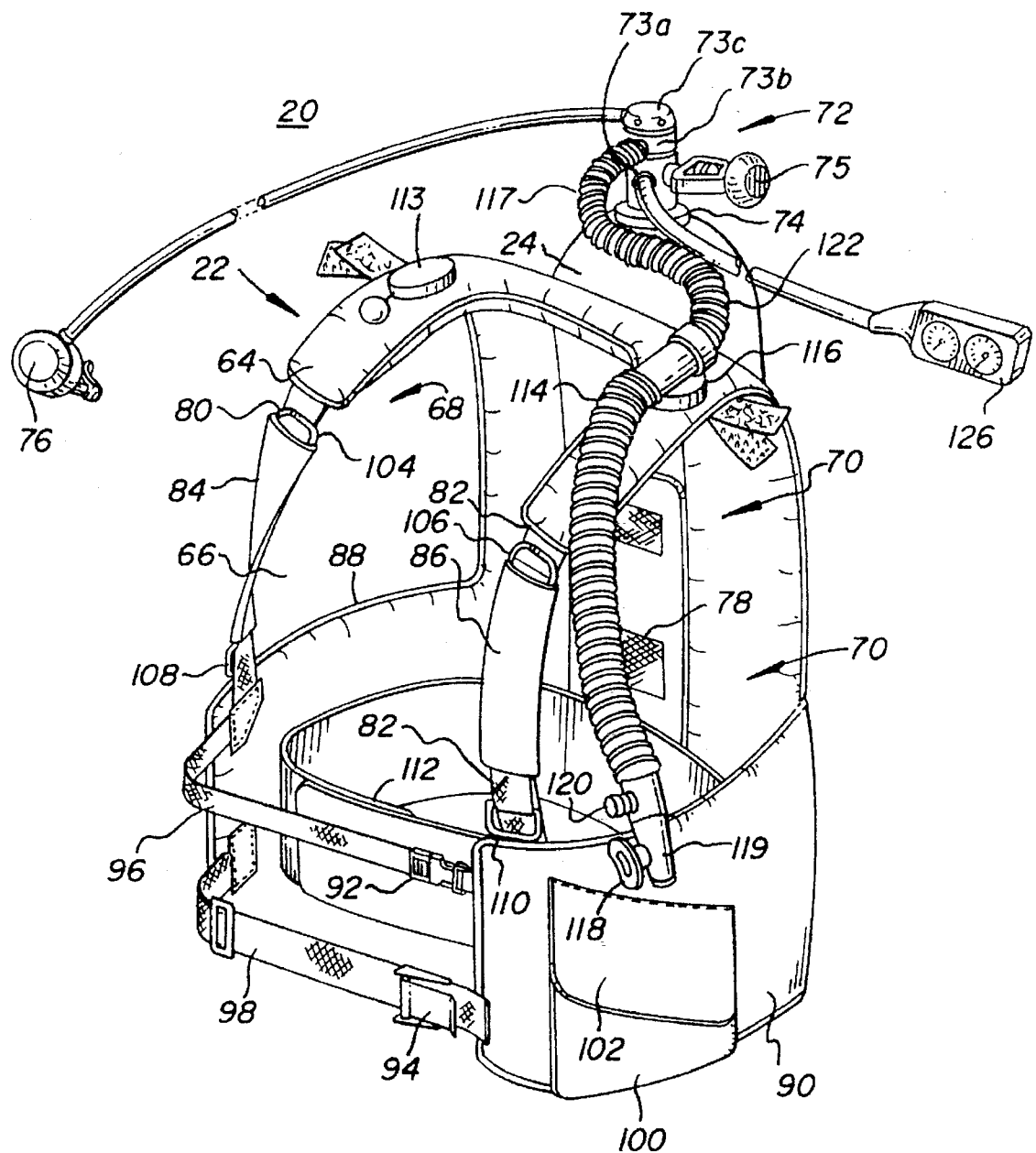
FIG. 1 is a perspective view of a diving outfit according to the present invention having a diving vest and an air tank.
Figure 2:
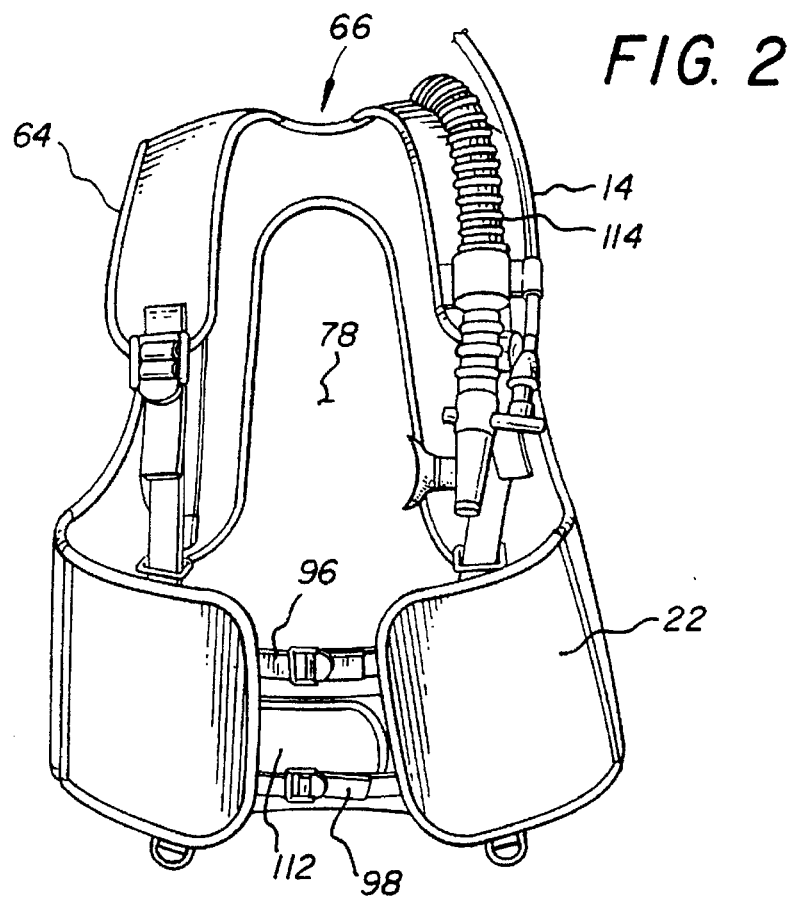
FIG. 2 is a front view of a diving vest according to FIG. 1.
Figure 3:
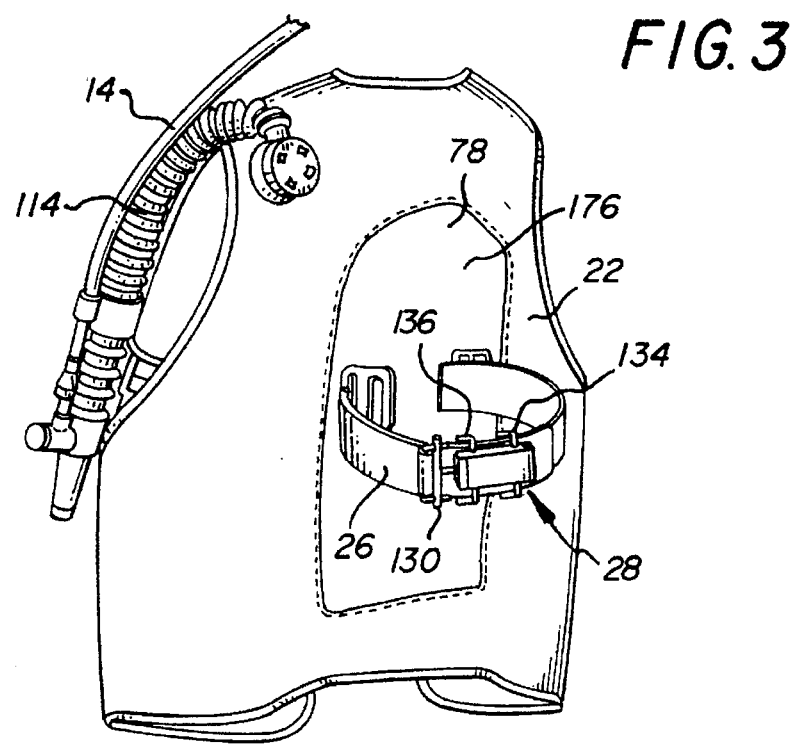
FIG. 3 is a rear perspective view of a diving vest according to FIG. 1.
Figure 4:
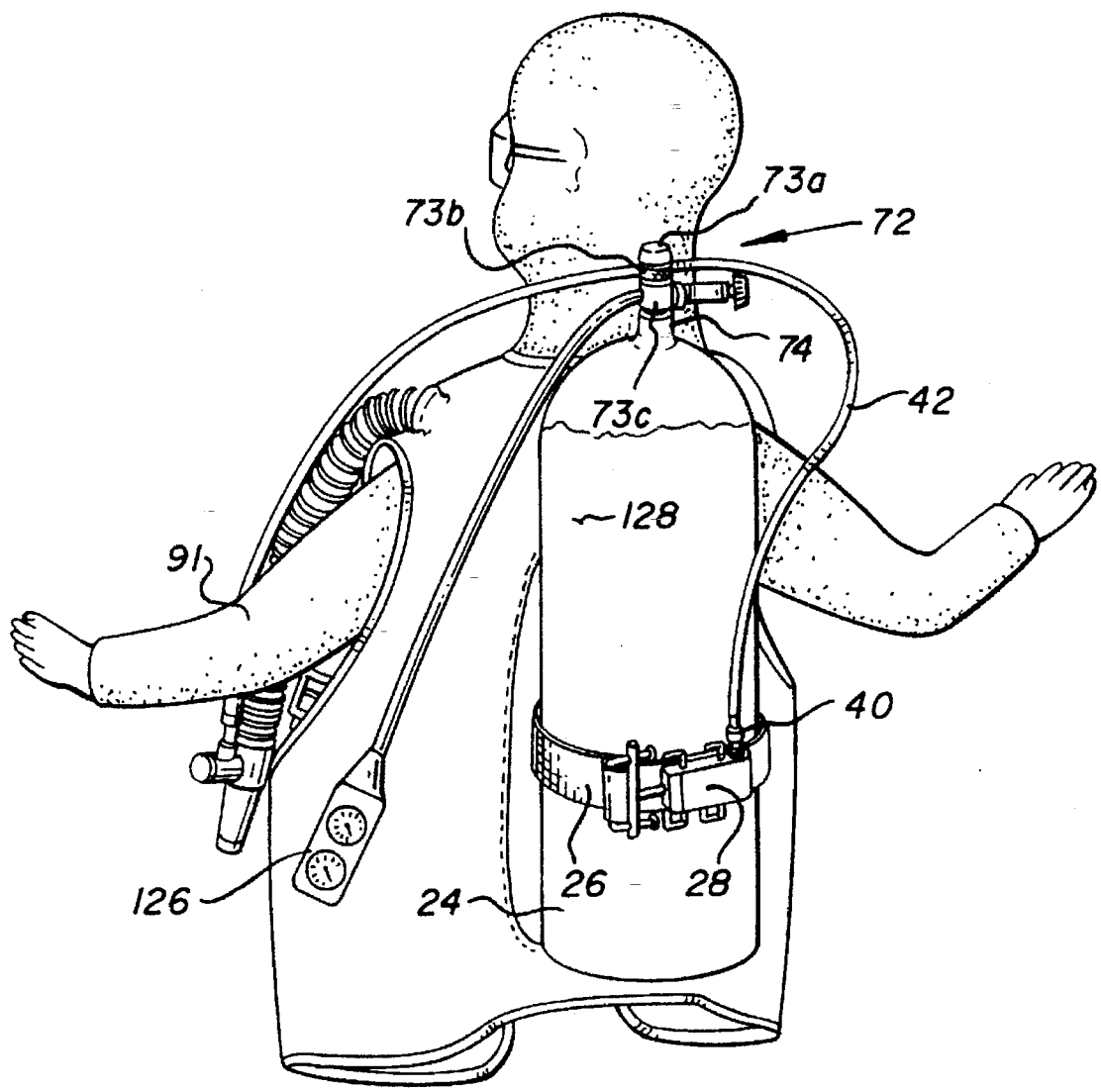
FIG. 4 is a rear perspective view of a diving outfit being worn by a diver according to FIG. 1.

A diving outfit (20) is provided comprising a vest (22) and an air tank (24). The diving vest (22) includes (a) a belt (26) (which may optionally be in equivalent forms such as ropes, straps, etc.) for securing the compressed air tank (24) to the vest (22), and (b) means (28) for tightening the belt (26) by compressed air pressure, as best shown in FIGS. 1, 2 and 3. As best shown in FIGS. 4, 5, 6, 7, 8, 9 and 10 the tightening device (28) (also referred to above as a means for tightening the belt by compressed air pressure), preferably comprises (i) a piston (30), (ii) a cylinder (32) receiving a rearward end (34) of piston (30), (iii) a catch (36) attached to a forward end (38) of the piston (30), and (iv) a coupler (40) for coupling with an air hose (42) for placing the coupler (40) in gaseous communication with the air tank (24). The belt (26) is attached at its one end (44) (anchoring end 44) to the cylinder (32), and the belt (26) is received and eventually grabbed by the catch (36) at a distant portion (46) of the belt (26).

The cylinder (32) preferably has a body block (48) having a cylindrically shaped cavity (50) having an opening (52) at a front end (54) of the body block (48), and preferably has a head block (56) attached to the front end (54) of the body block (48). The head block (56) has an orifice (58) overlaying the opening (52). The piston (30) has a sealed fitting (piston head) (60) in slidable engagement with the cavity (50), and has a throat (62) (which may also be referred to as a shaft) extending forwardly from the fitting (60) and out of the body block (48) through the head block orifice (58). The catch (36) is attached to the distant end of the throat (62) opposite the fitting (60).

The vest (22) has a garment element (64) having a front opening (66) and a pair of opposed arm openings (68), (70). As best shown in FIG. 10, the belt (24) is attached and/or held by the element (64) for securing the compressed air tank (24) to the element (64). An air pressure reduction unit (72) is preferably attached to an outlet (74) of the tank (24) for receiving pressurized air therefrom and reducing the pressure of the air to a suitable pressure for the tightening device (28) and then to a suitable pressure for the respirator (76). The coupler (40) is preferably a pull release coupler (40) for releasably coupling the hose (42) to the belt tightening means (28) for easy connect and disconnect between the hose (42) and the tightening device (28). A method for securing the air tank (24) to the diving vest (22) is provided involving (a) providing a tightening device (28) comprising (i) a piston (30), (ii) a cylinder (32) receiving the piston (30) in an elongated cavity (50), (iii) a coupler (40) in gaseous communication with the cavity (50) adjacent a rear end (77) of the cavity (50), and (iv) a catch (36) (which may also be referred to as a clamp (36)) attached to a forward end (38) of the piston (30), (b) providing a means for pressurized gaseous communication between the air tank (24) and the tightening device (28), (c) providing a belt (26) for securing the tank (24) to the vest (22), one portion (46) of the belt (24) being received by the catch (36), and another portion (end) (44) of the belt (26) being attached to the cylinder (32), (d) providing pressurized air from the air tank (24), through the means for pressurized gaseous communication (42) (hose (42), into the tightening device (28) for extension of the piston (30) along the cavity (50) for tightening of the belt (26) about the tank (24). The air pressure reduction unit (72) is also referred to as a multi-stage regulator and has a first stage (73a) having the same gas pressure as the tank (24), for example, between 300 and 3000 pounds per square inch (psi), a second pressure reduced stage (73b) having a gas pressure of between 90 and 150 psi and a third pressure reduced stage (73c) having a pressure of between 15 and 30 psi. Optionally, the air pressure reduction unit may have only the first stage (73a) and the second stage (73b), wherein the third stage (73c) is present in the mouth piece (76) to enhance the reliability of the ease of use of the regulator (72).

As shown in FIG. 1, the diving outfit (20) broadly includes the vest (22) and the air tank (24). The vest (22) includes the garment element (64) having arm openings (68, 70) formed between back portion (78) and shoulder straps (80, 82). Preferably the shoulder straps (80, 82) are received by respective sleeves (84, 86). Side areas (88, 90) also refer to as waist areas (88, 90) extend from opposite sides of the back portion (78) at a lower end thereof and may be tightened around the diver (91) by using adjustable buckles (92, 94) about corresponding waist straps (96, 98). Optionally, the garment element (64) may include a side pocket (100) having a cover flap (102). The shoulder straps (80, 82) may be adjustable by corresponding adjustment rings (104, 106) and may include handles or loops (108, 110) for fastening the items thereto. The element (64) preferably includes an elastomeric foam belt-like wrap (112) which fits around the waist of the diver (91), and may be secured at its opposing ends by loop and pile or suitable velcro material (not shown) or may remain unsecured. An exhaust valve (113) may be employed to deflate the buoyant vest (22).

The vest (22) may be inflatable and includes an air tube (114) which is secured at an intermediate position by a one way valve (116) to the shoulder of the element (64), and is attached at its upstream end (117) to the third stage (73a) of the air pressure reduction unit (72). The downstreamend (119) of the tube (114) includes a mouth piece (118) and a vest inflation valve (120) for controlling flow therethrough and for permitting inflation of the vest by breathing into the mouth piece (118). The tube (114) is connectable to the air pressure reduction unit (72) of the tank (24) for receiving suitable air pressures therefrom and suitable air flow therefrom for inflation of the vest (22). The vest (22) also has an exhaust valve (113) for deflation of the vest (22). The air pressure reduction unit (72) includes a first outlet (122) at the second stage (73b) for providing air flow to the air tube (114) (either directly as in FIG. 1 or indirectly as in FIG. 2) and includes a second outlet (124) at stage (73b) for providing air flow to and connecting with air hose (42) for providing air flow at a reduced pressure from the tank to the tightening device (28). The air pressure reduction unit (72) may further includes a gauge (126) for showing the tank pressure.

The tank (24) may optionally be received within a mesh bag (128) thereby minimizing slippage between the belt (26) and tank (24).

Figure 5:
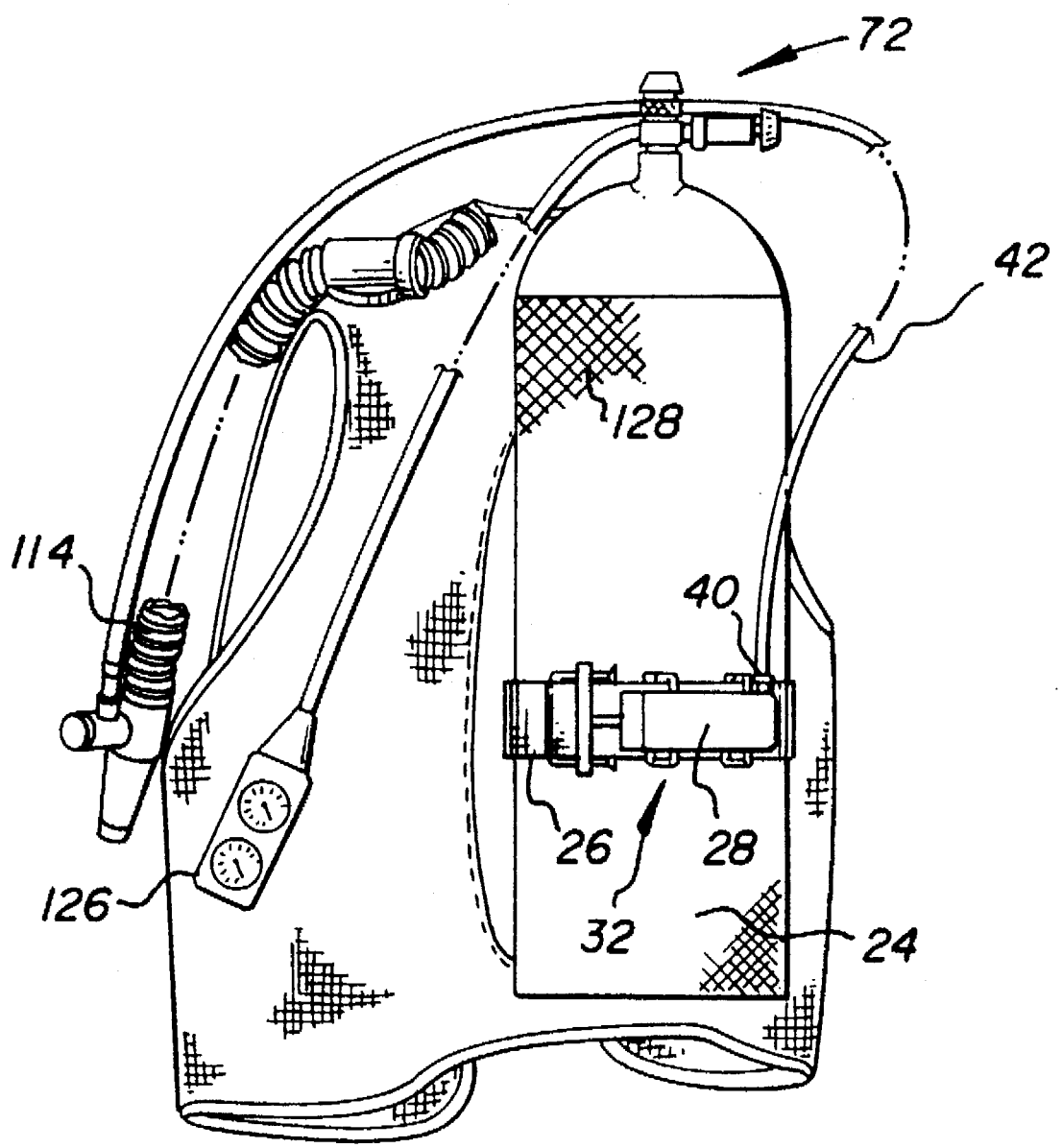
FIG. 5 is a rear perspective view of a diving outfit according to FIG. 1 wherein the piston is in an unextended position.
Figure 6:
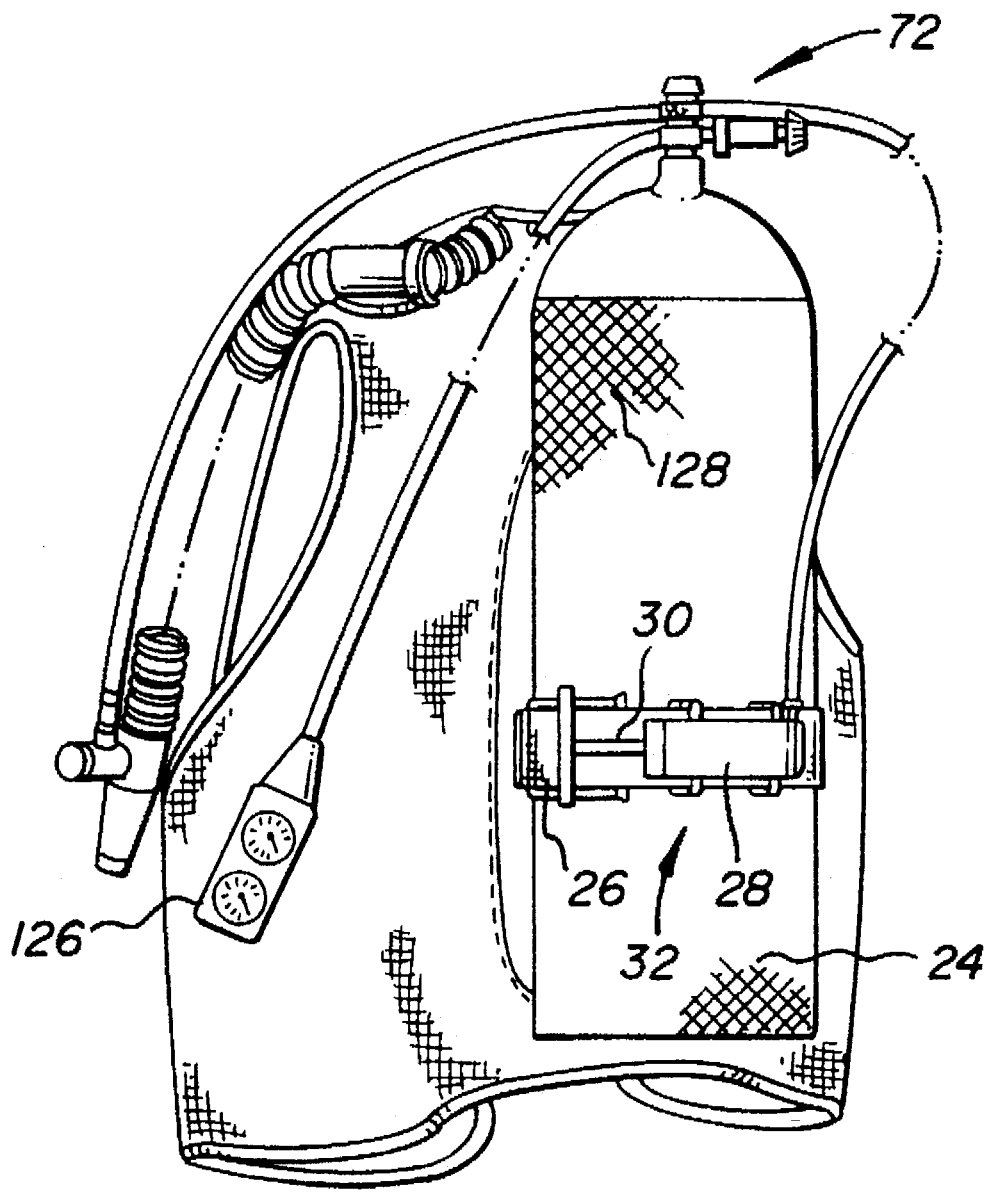
FIG. 6 is a rear perspective view of a diving outfit according to FIG. 1 wherein the piston is in an extended position.

As shown in FIG. 5, the tank (24) when it is initially placed within (encircled by) the belt (26), the tightening device (28) is in a unpressurized, unextended position, and upon application of pressure from the tank (24) into the device (28), the piston (30) is extended from the cylinder (32) and the belt (26) is tightened as best shown in FIG. 6. As can be seen in FIG. 6, the catch (36) sufficiently presses the belt portion (46) grabbed thereby between the piston crossbar (130) and the slidable u-shaped member (132). As can be seen in FIG. 7, the tightening device (28) includes the cylinder (32), the piston (30) and the coupler (40). The cylinder (32) includes loops (134, 136) pivotally attached thereto. The cylinder (32) includes the body block (48) and the head block (56). As can be seen in FIG. 7, the shaft (62) of the piston (30) extends outward from the block. The piston (30) at its forward end (38) has the catch (36) which includes the cross bar (130) extending perpendicular in a t-shaped manner from the shaft (62). At the outer extremes of the cross bar (130), the cross bar (130) has opposite holes (138, 140) which receive respective legs (142, 144) of u-shaped member (132). The rearward extremes (135, 137) of the legs (142, 44) are enlarged after insertion through the holes (138, 140) to prevent removal of the u-shaped member (132) from the cross bar (130). The legs (142, 144) slide within the holes (138, 140), and upon actuation, the main segment (146) (which extends between the legs (142, 144) and is integral therewith) of the u-shaped member (132) engages the belt (26) against the cross bar (130). As shown in FIG. 8, the coupler (40) is in gaseous communication with the rearward end (77) of the cavity (50) through passage way (150). In its retracted position, the piston (30) is situated such that the fitting (60) is adjacent the rearward end of the cavity (50), and upon flow of pressurized air through the coupler (40) into the passage way (150) and into the rearward end (77) of the cavity (50), the pressure against the rearward end (34) of the piston head (60) causes the piston (30) to be moved forwardly along the cavity (50) thereby extending the throat (62) and catch (36) further. Preferably the piston head (60) includes o-rings (152, 154) for sealed engagement against the interior wall (148) of the cavity (50) to prevent the pressurized air from escaping from the rearward end portion of the cavity (50). Preferably the piston head (60) has circumferential grooves (156, 158) for receiving the respective o-rings (152, 154). Metal cylindrical lips (160, 162, 164) (which may actually be machined from a single metal piece) are spaced apart and are approximately the diameter of the cavity (50) and effectively form the grooves (156, 158). The groove may be square or v-shaped, but preferably v-shaped. The v-shaped grooves appear to give an enhanced level of seal. The shaft (62) is of a substantially smaller diameter in cross section that of the cavity (50), and is received within the orifice (58) of the head block (56). The head block (56) may be attached to the body block (48) by screws (166, 168) as shown by FIG. 8.

As shown by FIG. 9, a cut away side elevational view of the tightening device (28) shows the cavity (50), the piston (30) and the cylinder (32).

As shown in FIG. 10, a top elevational view of the belt (26) and tightening device (28) shows that the belt (26) may be attached or simply held or retained by looping through slots (170, 172) in the back portion (78) of the garment element (64) of the vest (22).

As shown in FIG. 10, the belt (26) is attached at its anchor end (44) to loop (134) thereby securing the anchor end (44) of the belt (26) to the cylinder (32) of the tightening device (28). The belt (26) then loops around in circular form toward the first slot (170) through the back portion (78) to the wearer (diver) side (174) of the back portion (78), and then through the other slot (172) toward the tank side (176) of the back portion (78) through the first loop (134) through the second loop (136) up and over the member (132) back under the member (132) between the main segment (146) of the member (132) and the cross bar (130), and back through the loop (136) and then through the loop (134) thereby having the distant belt position (46) effectively grabbed by the catch (36). The extreme section (178) of the distant end portion (46) may optionally have a loop or pile or hook type material (180) such as that sold under the trademark Velcro which may be releasably attached to an intermediate portion (182) of the belt (26) having attached thereto a corresponding loop or pile or hook type (184) material for adhesion of the two materials (180, 184) to each other.

In operation, the belt (26) is initially loosely drawn or pulled through the catch (36) and then air pressure is applied to the tightening device (28) to effectively tighten the belt (26) around the tank (24) by extension of the piston (30) within the cylinder (32). The air pressure may be more broadly referred to as gas pressure.

Figure 11:
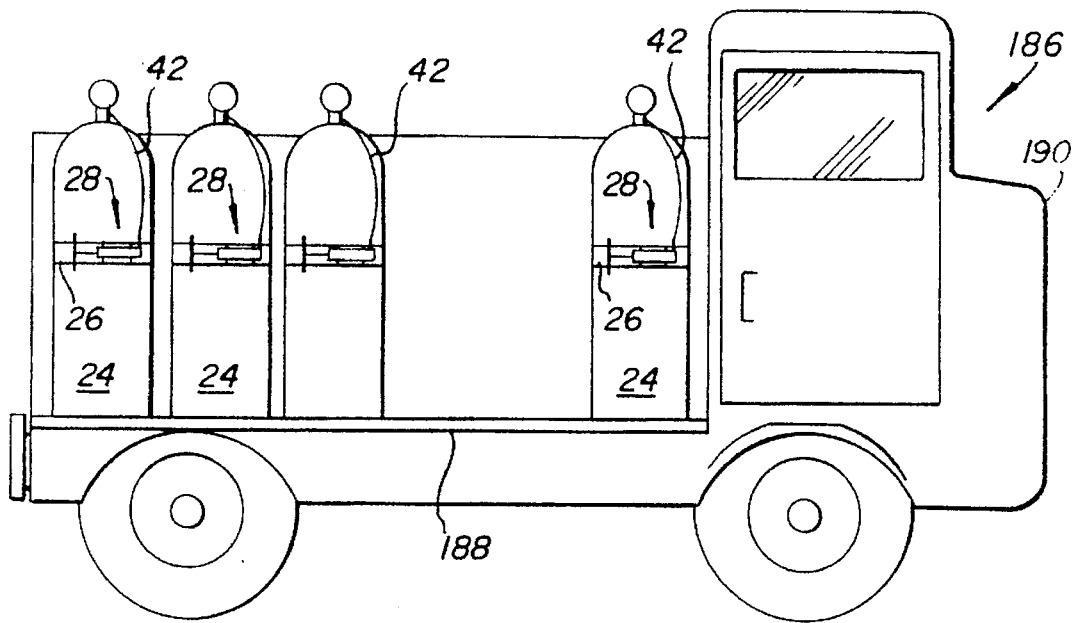
FIG. 11 is a side elevational view of the tightening device used in a delivery truck.

As best shown in FIG. 11, the device (28) may also be used to secure compressed tanks (24) to article (186) during transport, such as securing a compressed gas tank to a rack (188) on a delivery truck (180).

Figure 12:
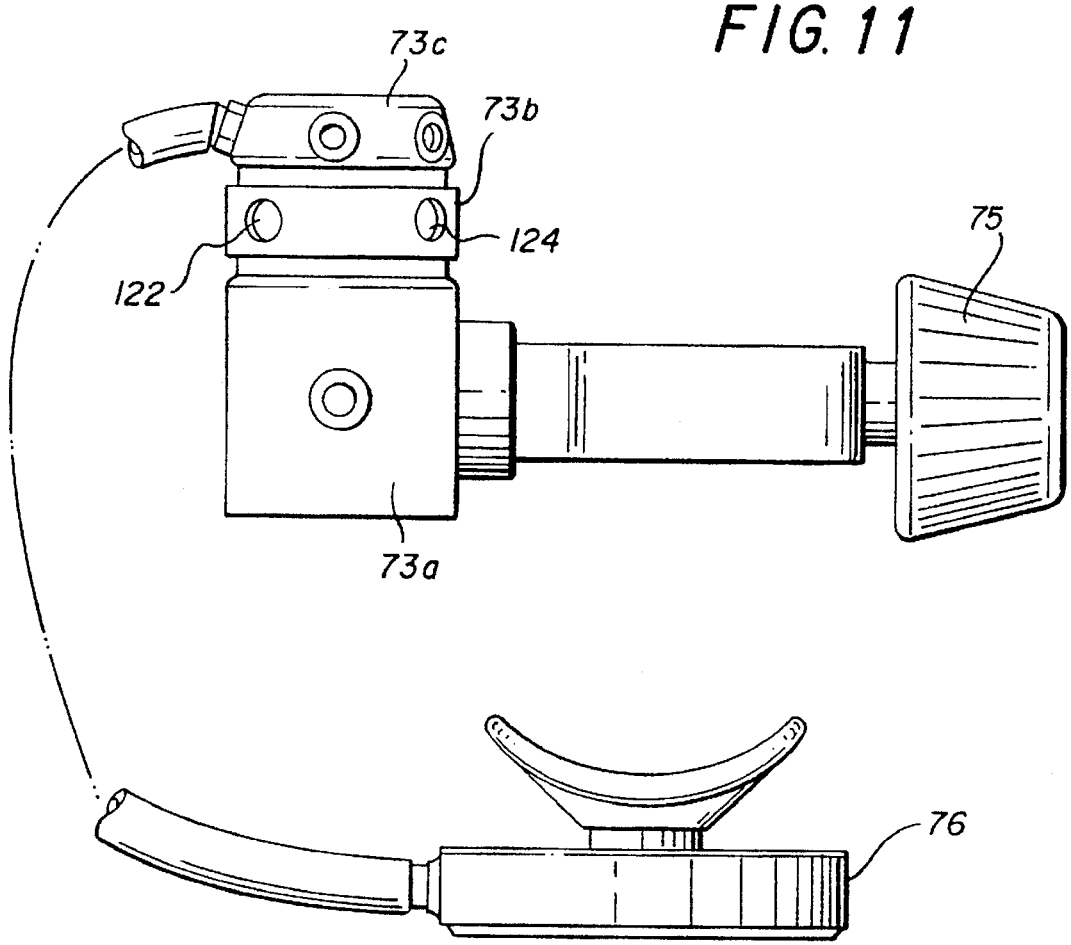
FIG. 12 is a side elevational view of a multi-stage air pressure reduction unit for use on the compressed air tank.

As best shown in FIG. 12, the air pressure reduction unit (72) has a valve (75) which can seal off the flow of pressurized gas from stage (73a) to stage (73b) and stage (73c).

I claim:

1. A diving outfit comprising:
   (a) a vest garment element having a front opening and arm openings,
   (b) a belt attached to said element for securing a compressed air tank to said element,
   (c) belt tightening means for tightening the belt by compressed air pressure,
   (d) an air tank having a gas at a pressure of between 300 and 3000 pounds per square inch,
   (e) an air pressure reduction unit attached to said tank, said unit having a first stage having a gas pressure of between 300 and 3000 pounds per square inch and having a second stage having a gas pressure of between 90 and 150 pounds per square inch,
   (f) an air hose extending from said second stage of said unit to said means for tightening, and
   (g) a pull release coupler for releasably coupling said hose to said belt tightening means.

2. The vest of claim 1 wherein said tightening means comprises:
   (a) a piston,
   (b) a cylinder receiving said piston,
   (c) a belt clamp attached to said piston.

3. A method for securing a compressed gas tank to an article, said method comprising:
   (a) providing a compressed gas tank having a gas pressure of between 300 and 3000 pounds per square inch, said compressed gas tank having an air pressure reduction unit attached to an outlet of said tank, said unit having a first stage having a gas pressure of between 300 and 3000 pounds per square inch and having a second stage having an air pressure of between 90 and 150 pounds per square inch,
   (b) providing a tightening device comprising (I) a piston, (ii) a cylinder receiving said piston in an elongated cavity, (iii) a coupler in gaseous communication with the cavity adjacent a rear end of said cavity, and (iv) a clamp attached to a forward end of said piston,
   (c) providing a means for pressurized gaseous communication between said second stage of said unit and said tightening device,
   (d) providing a belt around said tank secured to said clamp and attached to said cylinder, and
   (e) providing pressurized air from said air tank, through said second stage of said unit, through said means for pressurized gaseous communication, into said tightening device for extensions of said piston along said cavity for tightening of said belt about said tank.

4. The method of claim 2 wherein said means for pressurized gaseous communication comprises a regulator and a hose interconnected for gaseous flow therebetween.

5. The method of claim 3 wherein said article is a diving rest.

* * * * *